United States Patent
Alfut et al.

(10) Patent No.: US 10,929,012 B2
(45) Date of Patent: Feb. 23, 2021

(54) SYSTEMS AND METHODS FOR MULTIUSE OF KEYS FOR VIRTUAL KEYBOARD

(71) Applicant: Microsoft Technology Licensing, LLC, Redmond, WA (US)

(72) Inventors: Anna Maria Alfut, London (GB); Adam Clements, London (GB); Chetan Padia, London (GB); Simon Francis Ransome, Brome (GB); Scott D. Weiss, London (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 277 days.

(21) Appl. No.: 14/812,997

(22) Filed: Jul. 29, 2015

(65) Prior Publication Data
US 2016/0070468 A1    Mar. 10, 2016

Related U.S. Application Data

(60) Provisional application No. 62/048,199, filed on Sep. 9, 2014.

(51) Int. Cl.
*G06F 3/0488* (2013.01)

(52) U.S. Cl.
CPC ............... *G06F 3/04886* (2013.01)

(58) Field of Classification Search
CPC ............. G06F 3/04886; G06F 3/04883; G06F 3/0236; G06F 3/018; G06F 3/0233
See application file for complete search history.

(56) References Cited

U.S. PATENT DOCUMENTS

| 5,959,629 A * | 9/1999 | Masui | G06F 3/0237 345/179 |
| 6,826,729 B1 * | 11/2004 | Giesen | G06F 3/0481 715/808 |
| 2011/0285651 A1 * | 11/2011 | Temple | G06F 3/0233 345/173 |
| 2011/0302518 A1 * | 12/2011 | Zhang | G06F 3/0234 715/773 |
| 2012/0019540 A1 * | 1/2012 | Yaksick | G06F 3/04883 345/473 |
| 2012/0124527 A1 * | 5/2012 | Fujii | G06F 3/0233 715/863 |

(Continued)

*Primary Examiner* — Ajay M Bhatia
*Assistant Examiner* — Mong-Shune Chung
(74) *Attorney, Agent, or Firm* — Schwegman Lundberg & Woessner, P.A.

(57) ABSTRACT

Systems, methods, and computer-readable storage media are described for generating a virtual keyboard user interface that includes a popup area for selecting alternative characters. The user interface may include a plurality of keys generated on a display, with at least one key among the plurality of keys having a first character or action associated with the at least one key. The user interface may also include a popup area displayed so as to at least partially cover the at least one key, the popup area displaying one or more alternative characters or actions to the first character or action, and a visual indicator that instructs a user that the user may move the user's finger to the left or right of the at least one key, and without any vertical movement of the user's finger, to cause an alternative character or action within the popup area to be highlighted.

19 Claims, 8 Drawing Sheets

(56) References Cited

U.S. PATENT DOCUMENTS

| | | | |
|---|---|---|---|
| 2012/0299835 A1* | 11/2012 | Yoshida | G06F 3/04886 345/171 |
| 2013/0297307 A1* | 11/2013 | Paek | G10L 15/26 704/235 |
| 2014/0123050 A1* | 5/2014 | Danielsson | G06F 3/0237 715/773 |
| 2014/0245177 A1* | 8/2014 | Maklouf | G06F 3/0236 715/752 |
| 2014/0281964 A1* | 9/2014 | Han | G06F 3/016 715/708 |
| 2015/0100911 A1* | 4/2015 | Yin | G06F 3/04883 715/773 |

* cited by examiner

SYSTEMS AND METHODS FOR MULTIUSE OF KEYS FOR VIRTUAL KEYBOARD

CROSS REFERENCE TO RELATED APPLICATIONS

This application claims the benefit of U.S. Provisional Patent Application No. 62/048,199, titled SYSTEMS AND METHODS FOR MULTIUSE OF KEYS FOR VIRTUAL KEYBOARD, filed Sep. 9, 2014, the contents of which are incorporated herein by reference in their entirety.

TECHNICAL FIELD

The present disclosure relates to virtual keyboards and associating additional actions with the keys of a keyboard.

BACKGROUND

There are a number of known solutions for expanding the number of characters assigned to one or more keys of a virtual keyboard. For example, a user may tap and hold on a key (e.g., a punctuation key), in order to have a "mini keyboard" appear on a display screen. The mini keyboard will include a number of additional characters that could be selected in place of the character normally assigned to the selected key, such as a comma instead of a period. Once the mini keyboard has appeared, the user typically moves their finger up or down and/or left or right to select the desired character. In some implementations, the characters are displayed above the user's finger (so the finger doesn't obstruct visibility), but this tends to cause the user to move their finger up before moving left or right, which is unnecessary and slows down interaction with the mini keyboard.

The iKnowU Keyboard displays a large popup when the appropriate key is held down that includes alternative characters, but the user cannot move their finger left or right within the popup unless the user's finger is actually moved up into the popup, which is positioned above the punctuation key. Google Keyboard and Swype Keyboard each have similar popups that are likewise either positioned above or over the selected key and create the impression that the user is required to move their finger up into the popup before being able to move their finger to the left or right to select alternative characters, which causes the user to obscure the character they are attempting to choose, which in turn can confuse and frustrate users. The Minuum Keyboard in 'mini' mode includes a popup that enables the user to zoom in on an existing character and then generate an additional row of alternate characters by tapping and holding down on one of the primary characters. The alternative characters are only accessed when the user slides their finger up to the alternative character row. The full-size mode of the Minuum Keyboard is similar, but includes an expanded key height that displays the same single character and alternate character on an additional row.

SUMMARY

Systems, methods, and computer readable storage media are described for generating a popup area or window that displays alternative selectable characters in a mini or small keyboard upon selection or tapping and holding a key on a virtual keyboard. The mini keyboard characters appear above the touch point on the selected key, above the user's finger or other selection device, such as a stylus, etc., and/or above the original key. The height of the mini keyboard stretches from above the alternate characters to below the touch point, and in some cases, below the user's finger to the bottom or below the original key. The popup enables the user to slide left or right in order to select alternative characters without requiring any vertical movement of the finger and without causing the user to cover the character to be selected with their finger. The popup interface may also enable the user to more intuitively perform flick gestures, or rapid movements, to select alternative characters to the far left or far right or immediately to the left or right of the selected key with just the appropriate flick and without having to move their finger within the popup area.

DETAILED DESCRIPTION OF ILLUSTRATIVE EMBODIMENTS

Embodiments of the present disclosure increase the visibility and selectability of alternative characters displayed within a popup window generated around a selected key, and in some cases, enable alternative gestures for alternative character/action selection. Following a tap and hold gesture on a key within a virtual keyboard displayed on a touchscreen, a popup offering alternative characters or actions is displayed, where the popup is displayed above the selected key and stretches vertically to below the touch point of the selected key, and where a horizontal movement followed by a release of the hold gesture is used to select the required alternative character or action. Without moving within the popup, once the popup has been generated, or even before it is, the user can flick or otherwise rapidly move or accelerate their finger to the left or right to select alternative characters to the far left or right, or depending on the implementation to the immediate left or right, of the selected key.

Figure 1:
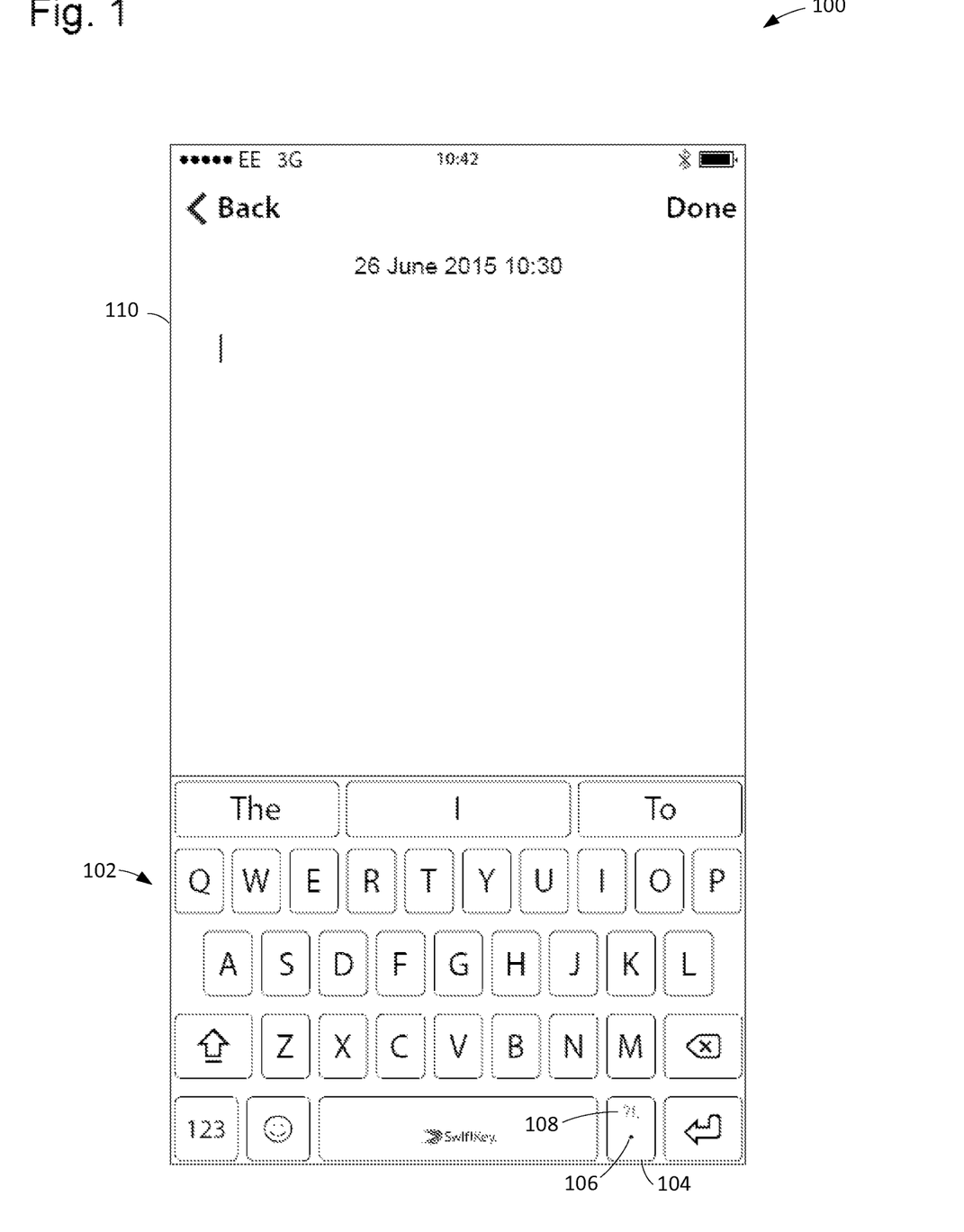
FIG. 1 illustrates an embodiment of a virtual keyboard in its default configuration without popups for alternative keys.

FIG. 1 illustrates a device 100 that includes a display screen 110 and a virtual keyboard 102 for enabling a user to interact with the device 100 and use various applications operating on the device 100. The keyboard 102 includes a punctuation key 104 that has a period 106 as the primary character displayed, but which also includes other punctuation characters 108 above the period 106 to indicate that the punctuation key 104 has alternative keys associated with it.

Figure 2:
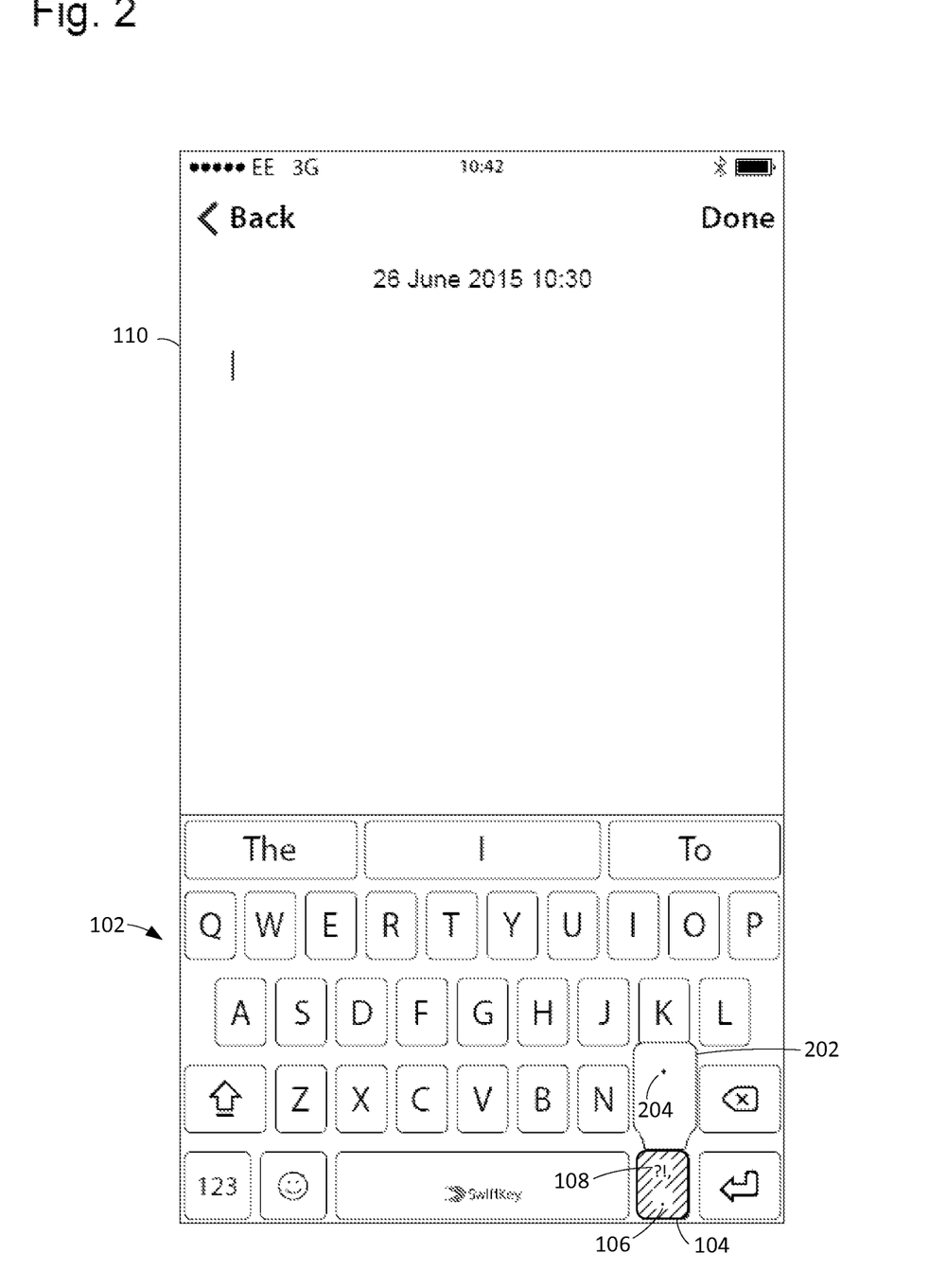
FIG. 2 illustrates an embodiment of a virtual keyboard having a popup highlighting the selected key.
Figure 3:
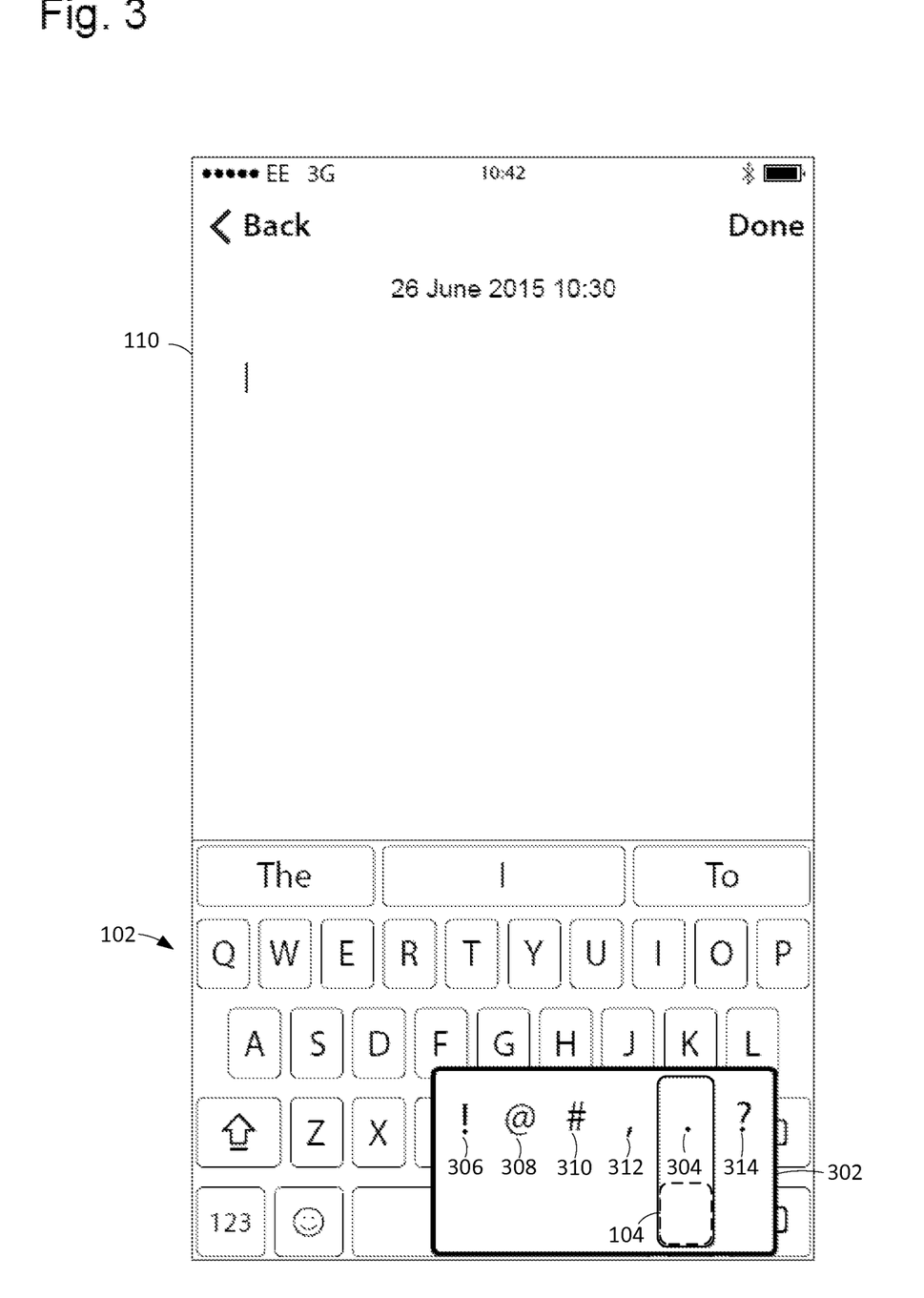
FIG. 3 illustrates an embodiment of a virtual keyboard having a popup displaying alternative keys when the user's finger is still on the selected key.
Figure 4:
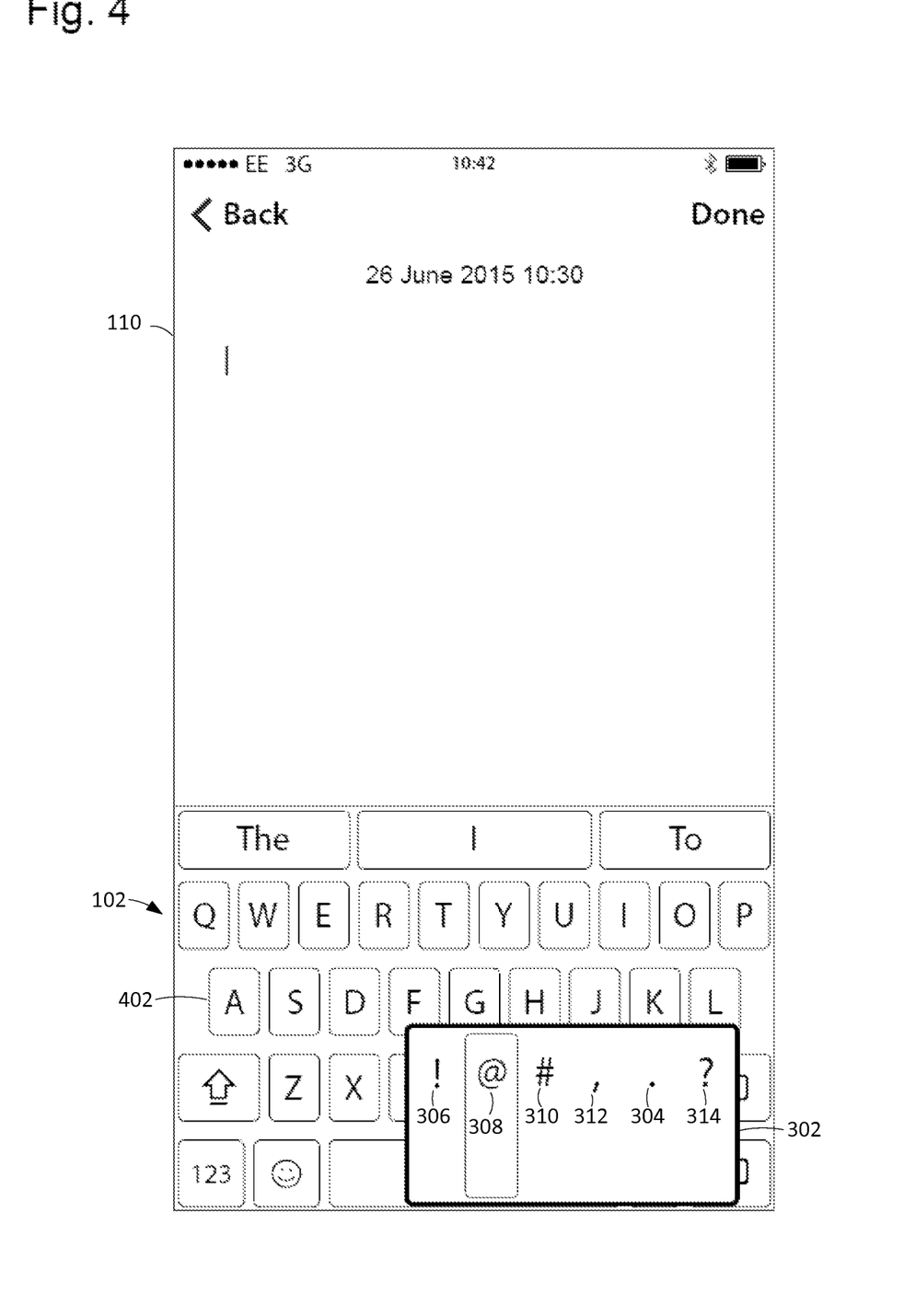
FIG. 4 illustrates an embodiment of a virtual keyboard having a popup displaying alternative keys when the user's finger has moved left or right of the selected key.

FIG. 2 illustrates a state of the virtual keyboard 102 when the user taps the punctuation key 104 for a short first period of time, thereby causing a popup 202 to appear above the selected key (which in the illustrated example, corresponds to the punctuation key 104), in this case generating a larger image 204 of the character 106 that corresponds to the selected key 104, without obscuring the character 106 to be selected. FIG. 3 illustrates a state of the virtual keyboard 102 when the user taps the punctuation key 104 for a longer second period of time, thereby causing a popup 302 to appear displaying a larger selected character 304 and alternative characters/keys 306, 308, 310, 312, 314 that the user may select by moving to the left or right of the larger selected character 304/selected key 104, and without having to move into an area of the popup 302 that would obscure an alternative key 306, 308, 310, 312, 314 to be selected. In some aspects, popup 302 may take up a larger space vertically than the selected key 104, such that keys associated with alternative characters 306, 308, 310, 312, 314 and the selected character 304 may be larger in the vertical dimension, including an empty or blank space or extended portion that when selected or touched and released by the user, selects the character located above the empty space. FIG. 4 illustrates the same virtual keyboard 102 and popup 302 of FIG. 3 in a state where the user has moved their finger to the left to select the "A" character 308. To select the alternative character 308, the user would then only need to remove their finger from the keyboard 102 or screen 110 of device 100.

The user could also, while positioned over the selected keys, such as keys 304 or 308 described above, swiftly move their finger to the left or right to immediately select an alternative character that would be available in the popup 302 to the left or right of the selected character if the popup 302 was to be used. In such an embodiment, the swift movement or flick gesture could be performed before the popup 302 is generated or after the popup 302 is generated, but without requiring the user to move their finger within the popup itself.

In an embodiment, the popup display area 302 may be visually split into multiple buttons/areas, or simply be a single area, such as popup area 302, containing multiple alternative characters 306, 308, 310, 312, 314. While the present disclosure illustrates the popup mini keyboard 302 for alternative punctuation, similar popup mini keyboards could be generated for other keys, such as the "a" key 402 having the following alternative characters available: å à á â ã ä æ.

Figure 5:
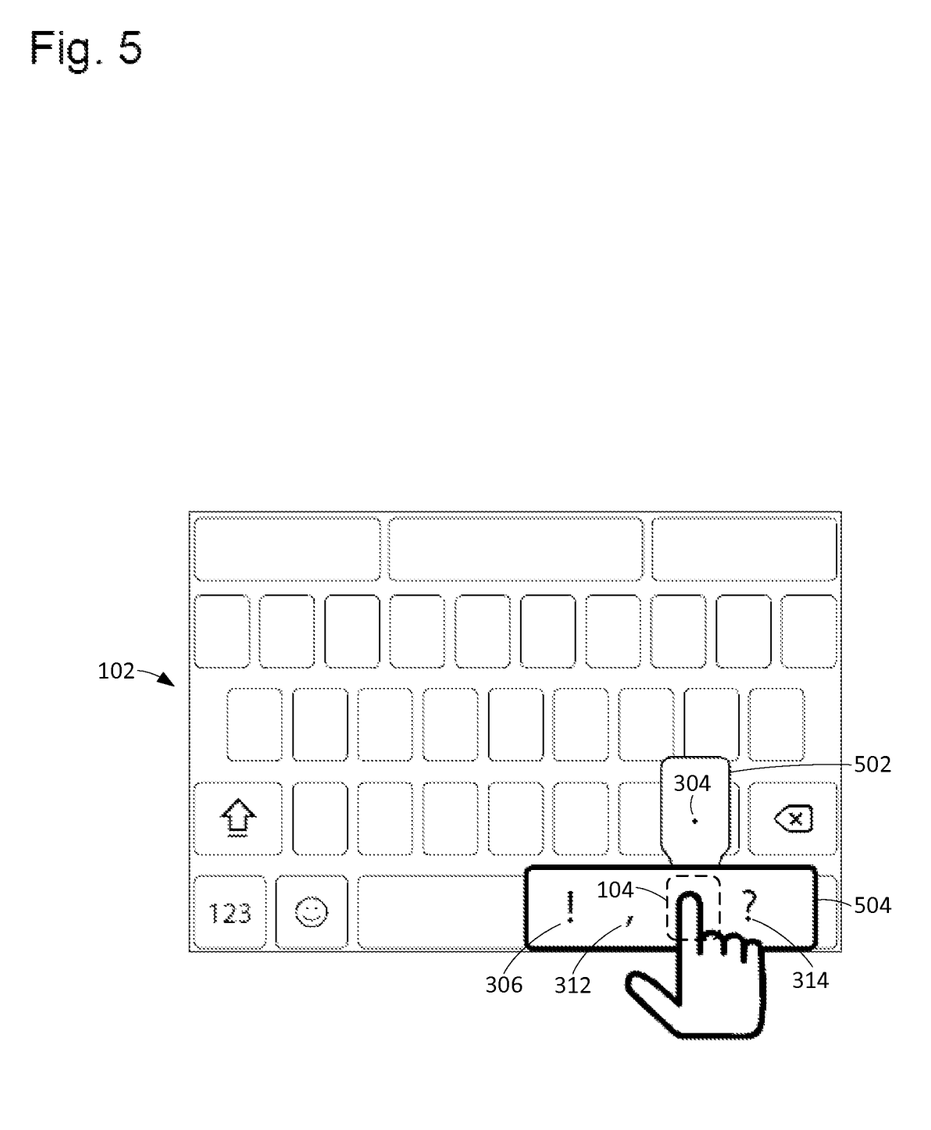
FIG. 5 illustrates an embodiment of a virtual keyboard having a popup for displaying a selected character and a slider for displaying alternative keys that can be selected with the user's finger moving left or right of the original key.
Figure 6:
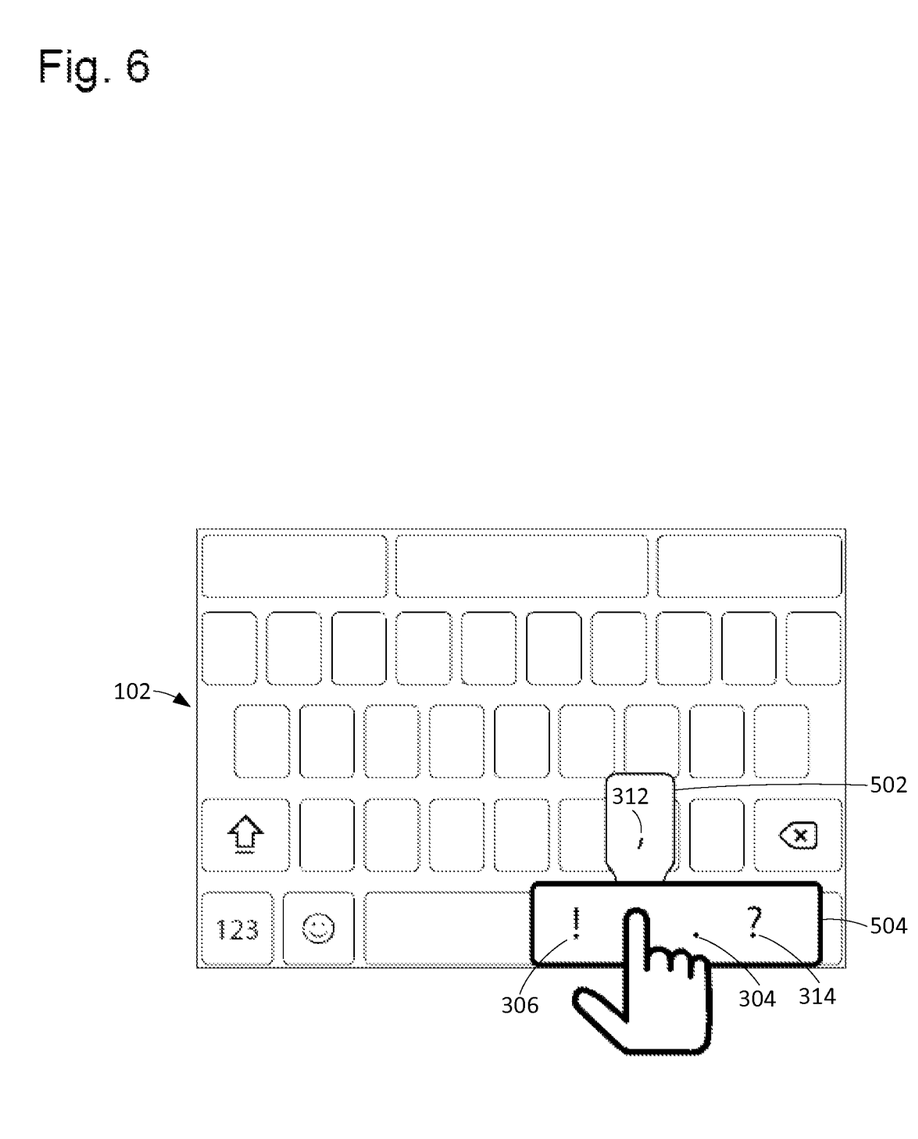
FIG. 6 illustrates an embodiment of a virtual keyboard popup and slider when the user has moved to an alternative key.

In an embodiment illustrated in FIG. 5, holding the selected key 104 causes a popup 502 to display above the key 104 and a slider 504 including alternative characters 306, 312, and 314, for example, to appear to the left and/or right of the selected key 104/selected character 304. Moving to the left or right of the selected key 104 will enable the user to select alternative keys 306, 312, 314, with each alternative key being displayed in the popup 502 above the slider 504 so as to not obscure the alternative character for selection. An example of this is illustrated in FIG. 6, where the user has moved from the period of the selected key 104/character 304 to the comma of the alternative character 312.

Figure 7:
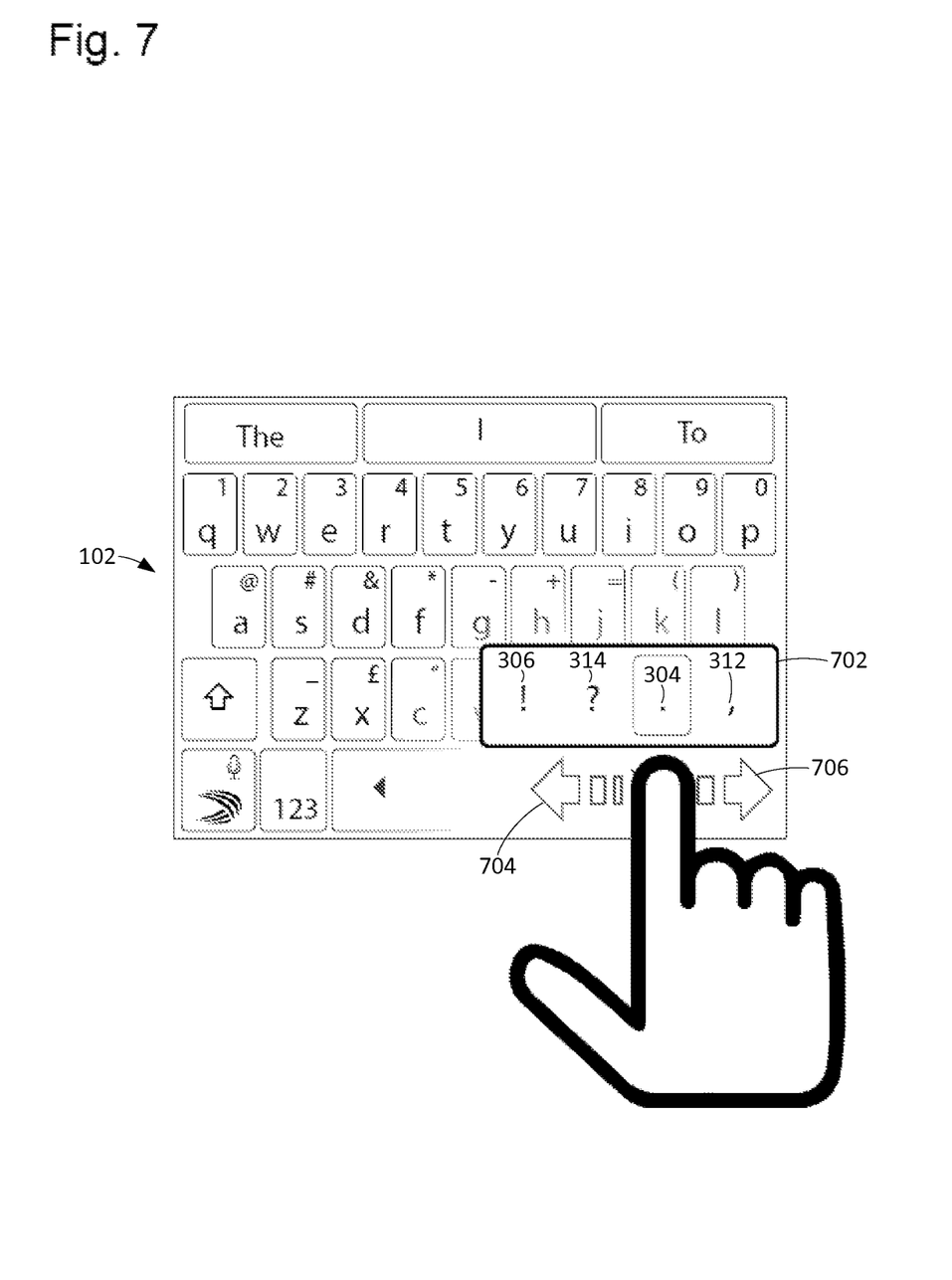
FIG. 7 illustrates an embodiment of a virtual keyboard having a popup and left/right arrows displayed over the top of the original key that indicate that the user can move left or right to select alternative keys.

In an embodiment, as illustrated in FIG. 7, a popup window 702 may be displayed above the selected key 104, which may be covered by the user's finger, which is then replaced with arrows 704, 706 pointing to the left and right that indicate to the user that moving left or right will cause alternative characters 306, 312, and 314, for example, to be selected without obscuring those alternative characters. The arrows 704, 706 may be superimposed over the originally selected key 104 and other keyboard elements, such as the spacebar key, return key, etc., to the left and right, which may be shown in a graduated way (e.g., increasing in transparency away from the selected key 104) to so as to make it clear that the other keyboard elements are still there below the arrows 704, 706, but hidden while the arrows 704, 706 are in use. Once an alternative key 306, 312, 314 has been selected, the popup 702 and arrows 704, 706 would disappear and the obscured keyboard elements would reappear.

Figure 8:
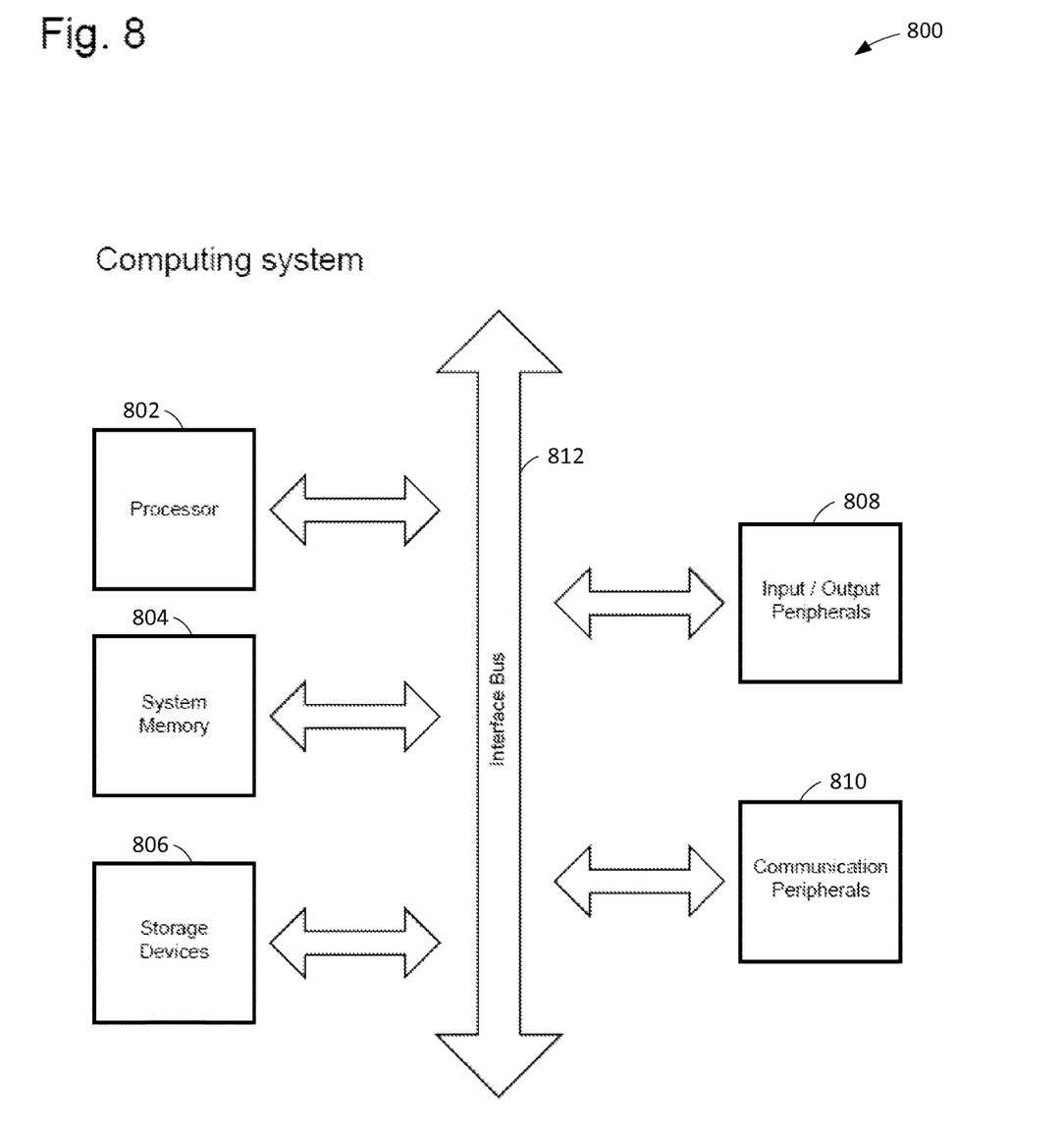
FIG. 8 illustrates an embodiment of a computing system.

As illustrated in FIG. 8, the methods and techniques described above may be implemented on a computing device associated with a user, a plurality of computing devices associated with a plurality of users, a server in communication with the computing device(s), or a plurality of servers in communication with the computing device(s). Additionally, the techniques may be distributed between the computing device(s) and the server(s).

In an embodiment, a non-transitory computer readable storage medium may comprise instructions that, when executed on a system, are configured to operate the virtual keyboard 102 as described herein. FIG. 8 describes one embodiment of a computing system 800 on which such a virtual keyboard 102 may operate, which computing system 800 includes hardware modules, software module, and a combination thereof, and that can be implemented as a computing device of a user.

In a basic configuration, the computing system 800 may include at least a processor 802, a system memory 804, a storage device 806, input/output peripherals 808, communication peripherals 810, and an interface bus 812. The interface bus 812 is configured to communicate, transmit, and transfer data, controls, and commands between the various components of the computing system 800. The system memory 804 and the storage device 806 comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory 804 comprises an operation system and applications. The processor 802 is configured to execute the stored instructions and can comprise, for example, a logical processing unit, a microprocessor, a digital signal processor, and the like.

Further, the input and output peripherals 808 include user interfaces such as a screen, microphone, speaker, other input/output devices, and computing components such as digital-to-analog and analog-to-digital converters, graphical processing units, serial ports, parallel ports, universal serial bus, transmitter, receiver, and so on. The input/output peripherals 808 may be connected to the processor 802 through any of the ports coupled to the interface bus 812.

The user interfaces can be configured to allow a user of the computing system 800 to interact with the computing system 800. For example, the computing system 800 may include instructions that, when executed, cause the computing system 800 to generate a user interface that the user can use to provide input to the computing system 800 and to receive an output from the computing system 800. This user interface may be in the form of a graphical user interface that is rendered at the screen and that is coupled with audio transmitted on the speaker and microphone and input received at the keyboard. In an embodiment, the user interface can be locally generated at the computing system 800. In another embodiment, the user interface may be hosted on a remote computing system and rendered at the computing system 800. For example, the server may generate the user interface and may transmit information related thereto to the computing device 800 that, in turn, renders the user interface to the user. The computing device 800 may, for example, execute a browser or an application that exposes an application program interface (API) at the server to access the user interface hosted on the server.

Finally, the communication peripherals 810 of the computing system 800 are configured to facilitate communication between the computing system 800 and other computing systems (e.g., between the computing device 800 and the server) over a communications network. The communication peripherals 810 include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of certain of the disclosures herein.

What is claimed:

1. A computing device comprising a processor and memory, the memory storing computer-executed instructions that, when executed by the processor, cause the computing device to perform operations comprising:
   render a plurality of keys on a display, at least one key among the plurality of keys having a first character or action associated with the at least one key;
   receive a user input selecting the at least one key;
   in response to the user input, render a popup area on the display above the at least one key and obscuring at least one of the plurality of keys other than the at least one key, the popup area displaying a plurality of alternative characters or actions to the first character or action in a single row; and
   wherein the popup area is configured, based on a gesture input in a left horizontal direction or a right horizontal direction, to cause an alternative character or action of the plurality of alternative characters or actions within the popup area to be highlighted, and wherein any vertical movement of the gesture is disregarded while all of the plurality of alternative characters or actions that are displayed are accessible by the gesture.

2. The computing device as recited in claim 1, wherein the instructions further cause the computing device to perform operations comprising: render, on the display outside of the popup area, a directional visual indicator that comprises a slider displayed to the left and/or right of the at least one key, and wherein the popup area only displays the alternative character or action based on where a user's finger is on the slider.

3. The computing device as recited in claim 1, wherein the instructions further cause the computing device to perform operations comprising: render, on the display outside of the popup area, a directional visual indicator that comprises an arrow slider displayed to the left and/or right of the at least one key, and wherein the popup area displays the alternative character or action based on where a user's finger is on the arrow slider.

4. The computing device as recited in claim 3, wherein the arrow slider is superimposed over other keys among the plurality of keys.

5. The computing device as recited in claim 4, wherein the arrow slider gradually obscures the other keys.

6. The computing device as recited in claim 1, wherein the popup area further displays the first character or action.

7. The computing device as recited in claim 1, wherein the alternative characters or actions are selected without requiring the user to move a user's finger into the popup area.

8. The computing device as recited in claim 1, wherein at least one of the alternative characters or actions are selectable by a flick gesture to the left or right of the at least one key.

9. The computing device of claim 1, wherein the one or more alternative characters or actions are selectable based on the gesture with the gesture remaining within the at least one key.

10. A computing device, comprising:
a touchscreen display;
one or more processors; and
memory storing instructions configured to be executed by the one or more processors, the instructions causing the one or more processors to:
generate a plurality of keys on the touchscreen display, wherein at least one key among the plurality of keys is associated with a first character or action;
receive a user input selecting the at least one key;
in response to the user input, generate a popup area on the touchscreen display, the popup area displayed above the at least one key and obscuring at least one of the plurality of keys other than the at least one key, the popup area displaying a plurality of alternative characters or actions to the first character or action in a single row; and
wherein the popup area is configured, based on a gesture input in a left horizontal direction or a right horizontal direction, to cause an alternative character or action of the plurality of alternative characters or actions within the popup area to be highlighted, and wherein any vertical movement of the gesture is disregarded while all of the plurality of alternative characters or actions that are displayed are accessible by the gesture.

11. The computing device as recited in claim 10, wherein the instructions further cause the one or more processors to generate, on the touchscreen display outside of the popup area, a directional visual indicator that comprises a slider displayed to the left and/or right of the at least one key, and wherein the popup area displays the alternative character or action based on where a user's finger is on the slider.

12. The computing device as recited in claim 10, wherein the instructions further cause the one or more processors to generate, on the touchscreen display outside of the popup area, a directional visual indicator that comprises an arrow slider displayed to the left and/or right of the at least one key, and wherein the popup area only displays the alternative character or action based on where a user's finger is on the arrow slider.

13. The computing device as recited in claim 12, wherein the arrow slider is superimposed over other keys among the plurality of keys.

14. The computing device as recited in claim 13, wherein the arrow slider gradually obscures the other keys.

15. The computing device as recited in claim 10, wherein the popup area further displays the first character or action.

16. The computing device as recited in claim 10, wherein the alternative characters or actions are selected without requiring the user to move a user's finger into the popup area.

17. The computing device as recited in claim 10, wherein at least one of the alternative characters or actions are selectable by a flick gesture to the left or right of the at least one key.

18. A non-transitory computer-readable medium comprising instructions, that when executed by a computing device having a touchscreen display, cause the computing device to perform operations comprising:
rendering a plurality of keys on the touchscreen display, at least one key among the plurality of keys having a first character or action associated with the at least one key;
receive a user input selecting the at least one key;
in response to the user input, rendering a popup area on the touchscreen display above the at least one key and obscuring at least one of the plurality of keys other than the at least one key, the popup area displaying a plurality of alternative characters or actions to the first character or action; and
wherein the popup area is configured, based on a gesture input in a left horizontal direction or a right horizontal direction, to cause an alternative character or action of the plurality of alternative characters or actions within the popup area to be highlighted, and wherein any vertical movement of the gesture is disregarded while all of the plurality of alternative characters or actions that are displayed are accessible by the gesture.

19. The non-transitory computer-readable medium as recited in claim 18, wherein the instructions further cause the computing device to perform operations of rendering a directional visual indicator above and below a touch point on the at least one key, and wherein all of the alternative characters or actions are displayed in the popup area without being displayed over the at least one key.

* * * * *